United States Patent [19]

Adachi et al.

[11] 4,365,037

[45] Dec. 21, 1982

[54] GLASS FIBER-REINFORCED POLYARYLENE SULFIDE RESIN COMPOSITION

[75] Inventors: Tuneyuki Adachi, Nara; Hiroshi Nakamura, Sakai, both of Japan

[73] Assignee: Dainippon Ink & Chemicals, Inc., Tokyo, Japan

[21] Appl. No.: 283,373

[22] Filed: Jul. 15, 1981

[30] Foreign Application Priority Data

Jul. 18, 1980 [JP] Japan .................................... 55-98269
Oct. 3, 1980 [JP] Japan ................................ 55-137580

[51] Int. Cl.³ ............................................ C08L 81/00
[52] U.S. Cl. .................................. 524/449; 524/494; 524/609
[58] Field of Search ............. 260/37 R; 524/449, 494, 524/609

[56] References Cited

U.S. PATENT DOCUMENTS 3,354,129  11/1967  Edmonds et al. ................ 260/37 R Primary Examiner—Lewis T. Jacobs
Attorney, Agent, or Firm—Sherman & Shalloway

[57] ABSTRACT

A glass fiber-reinforced polyarylene sulfide resin composition comprising a polyarylene sulfide resin and glass fibers having a diameter of from 5 to 11.5 microns, and as an optional component, mica powder.

9 Claims, No Drawings

GLASS FIBER-REINFORCED POLYARYLENE SULFIDE RESIN COMPOSITION

This invention relates to a glass fiber-reinforced polyarylene sulfide resin composition.

Polyarylene sulfide resins are attracting attention as high-performance engineering plastics having higher heat resistance, chemical resistance and rigidity than usual engineering plastics such as polycarbonate, polyacetal, nylon and polybutylene terephthalate, but have the serious defect that they possess poor ductility and are brittle. It is known that inclusion of a fibrous reinforcing material such as glass fibers in these resins leads to a striking improvement in their properties necessary as engineering plastics, such as strength, rigidity, toughness, heat resistance and dimensional stability. It is also known that with a glass fiber-reinforced polyarylene sulfide resin composition, the strength and rigidity increase generally with increasing amount of the glass fibers incorporated therein. Accordingly, when increased strength and rigidity are desired, it is the general practice to increase the amount of the glass fibers incorporated into the resin composition.

Increasing of the amount of the glass fibers, however, causes some defects. Firstly, the surface condition of a molded article prepared from the resulting resin composition becomes poor as the amount of the glass fibers increases, and raising of the glass fibers from the surface of the molded article is conspicuous. Secondly, in a step of kneading or injection molding of the glass fiber-reinforced composition, wearing of the screw or the inner wall of the cylinder barrel of the extruder or the injection molding machine increases with increasing amount of the glass fibers. Thirdly, since the glass fibers have a specific gravity of about 2.5 and the polyarylene sulfide resin has a specific gravity of about 1.4, the weight of the composition increases with increasing amount of the glass fibers, resulting in a loss of the significance of weight reduction basically required of engineering plastics. This entails an increase in the cost of production per unit volume of a molded product. Lastly, the composition has poor flowability during molding so that a thin article is difficult to mold from the composition.

Prior efforts to remove the aforesaid defects are generally directed to (1) the improving of the interface adhesion strength between the resin and the glass fibers, and (2) the increasing of the aspect ratio, i.e. the ratio of length (L) to diameter (D), L/D, of the glass fibers contained in the composition. With regard to (1), the surface of the glass fibers may be coated with a surface treating agent such as a silane coupling agent to increase the adhesion between the glass fibers and the resin. If, however, the amount of the surface treating agent increases beyond a certain limit, the improvement of the adhesion strength reaches saturation, and no further increase in strength can be expected. In addition, since commercially available glass fibers have already been subjected to an optimum surface treatment, it is almost impossible to increase their strength further by treating them with an additional surface treating agent. As regards (2), increasing of the fiber length L is the only method which can achieve an increased L/D ratio because all commercial glass fibers have the same diameter (D) of about 13 microns. If in reinforcing the resin with the glass fibers the kneading efficiency during kneading of the two in an extruder is reduced, the shearing force during the kneading becomes low. This, in turn, reduces the occurrence of breakage and crushing of the fibers, and the fiber length L does not decrease. On the other hand, this impairs the uniform dispersibility of the glass fibers, and renders "wetting" between the resin and the glass fibers non-uniform so that a sufficient adhesion strength between them cannot be obtained. Hence, an attempt to increase L will result in a reduction in strength. Thus, no method has been discovered up to date which can remedy all of the aforesaid defects.

The present inventors have found that if glass fibers having a specified diameter are used as a reinforcing material, the strength of a polyarylene sulfide resin can be exceedingly increased without the need to increase the amount of the glass fibers incorporated in the resin, and that the use of a specified mica powder with the aforesaid glass fibers can reduce deformation and shrinkage of molded articles obtained from the resulting resin composition and increase their heat resistance.

According to this invention, therefore, a glass fiber-reinforced resin composition is provided which comprises chopped glass fibers having a diameter of from 5 to 11.5 microns (which is smaller than that of ordinary chopped glass fibers) and a polyarylene sulfide resin, and as an optional component, a mica powder.

The composition of this invention brings about unexpected results. Specifically, when the amount of glass fibers incorporated is the same, a molded article prepared from the composition of the invention has better surface smoothness than that prepared from a polyarylene sulfide composition containing usual commercial chopped glass fibers having a diameter of 13 microns in spite of the fact that its strength is about 20 to 30% higher than the latter. Moreover, wearing of the processing machines used in the steps of obtaining the composition of the invention and molded articles therefrom remains the same as in the case of the conventional composition. Another effect is that the flowability of the composition of the invention during injection molding is not reduced as compared with the conventional composition.

The polyarylene sulfide resin in accordance with this invention usually has a melt flow rate, determined in accordance with ASTM D1238-70 (at 300° C. under a load of 2160 g), of from 8 to 50, preferably from 10 to 40. Preferably, it has a crosslinking speed, expressed by the following formula, of not more than 1.3, preferably not more than 1.2.

$$\log (MFR_0/MFR_{60})$$

wherein $MFR_0$ is the melt flow rate (g/10 minutes) of the polyarylene sulfide before heat treatment, and $MFR_{60}$ is the melt flow rate (g/10 minutes) of the polyarylene sulfide which has been heated at 270° C. for 60 minutes in air.

If the melt flow rate of the polyarylene sulfide resin is less than 8, the uniform dispersibility of the glass fibers therein becomes poor, and the flowability of the resulting composition during molding and the mechanical strength of a molded product prepared from it are reduced. If it exceeds 50, the flowability of the composition is too high, and flashes tend to occur in injection-molded articles. Furthermore, when the crosslinking speed (as defined hereinabove) exceeds 1.3, both the extrudability of the composition and the mechanical properties of the resulting molded article are reduced.

The polyarylene sulfide resin in accordance with this invention can be produced, for example, by reacting a polyhalogenated aromatic compound with an alkali metal sulfide in a polar solvent (the method disclosed, for example, in U.S. Pat. Nos. 3,322,834, 3,354,129, and 3,607,843). Polyphenylene sulfide resin is a typical example of the polyarylene sulfide resin. It also includes polysulfide copolymers represented by the general formula

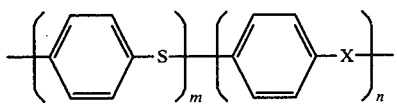

wherein m and n are any integers, and X is —O—, —SO$_2$—, —SO—, or —C(CH$_3$)$_2$—(U.S. Pat. No. 4,102,875).

Chopped strand glass fibers having a diameter (D) of 5 to 11.5 microns, and preferably having a length (L) of about 0.5 to 15 mm are used as the glass fibers in the composition of this invention. If the diameter of the glass fibers exceeds 11.5 microns, the increased strength and rigidity as shown in the present invention cannot be expected. If, on the other hand, the diameter (D) is less than 5 microns, the glass fibers themselves are difficult to produce, and are likely to induce silicosis in the working personnel during handling. The especially preferred diameter (D) is in the range of 7 to 11 microns.

The glass fibers may be surface-treated with epoxysilanes, aminosilanes, vinylsilanes and other coupling agents, and binders.

The proportions of the glass fibers and the polyarylene sulfide resin are usually such that 30 to 95 parts by weight of the polyarylene sulfide resin and 70 to 5 parts by weight of the glass fibers are used with the total amount of the two being 100 parts by weight of the two. If the proportion of the glass fibers exceeds 70 parts by weight, the amount of the glass becomes excessive, and kneading between the glass fibers and the resin becomes difficult. If, on the other hand, it is less than 5 parts by weight, the degree of improvement in strength and rigidity is small as compared with a non-reinforced polyarylene sulfide resin. Preferably, 35 to 90 parts by weight of the polyarylene sulfide resin and 65 to 10 parts by weight of the glass fibers are used, provided that the total weight of the two is 100 parts by weight.

A specified mica powder may be used in combination with the glass fibers and the polyarylene sulfide resin. The mica powder that can be used in this invention has (a) a particle diameter such that at least 90% by weight of it consists of particles having a particle size smaller than 100 mesh in accordance with a JIS standard sieve, and (b) an Mg/Fe weight ratio of at least 2.0, a bonded water content of not more than 2% by weight and a dehydration starting temperature of at least 400° C.

Mica having an Mg/Fe ratio of less than 2 is called biolite. A glass fiber-reinforced polyarylene sulfide resin containing such mica has low strength and toughness and is not feasible in practical applications. Moreover, since the amount of the Fe component becomes excessive, the resulting composition has markedly degraded electrical properties, in particular, markedly reduced inherent resistance values, arc resistance and dielectric strength, and is unsuitable for use as electrical insulating parts which are the main use of engineering plastics.

Furthermore, mica should have a bonded water content of not more than 2% by weight and a dehydration starting temperature of at least 400° C. If the content of the bonded water is larger than 2% by weight, or the dehydration starting temperature is lower than 400° C. (even if the water content is not more than 2% by weight), the keading of the polyarylene sulfide resin, the glass fibers and the mica is carried out at a temperature of as high as 280° to 400° C. Hence, dehydration of mica which occurs during the kneading accelerates degradation of the resin. Suzorite Mica occurring in Quebec, Canada is an example of mica which meets the above requirements.

If the proportion of mica particles having a particle diameter larger than 100 mesh is more than 10% by weight, the interface adhesion of the mica particles to the polyarylene sulfide resin is reduced, and the mechanical strength of the resulting polyarylene sulfide resin composition does not reach a practical level and may be lower than the strength of a non-reinforced polyarylene sulfide resin. Furthermore, since the mica particles are coarse, they will be raised onto the surface of the molded articles.

The suitable amount of the mica powder is 10 to 70% by weight, preferably 15 to 65% by weight, based on the weight of the polyarylene sulfide resin. If the amount of the mica powder is larger than 70% by weight, the proportion of the resin component becomes smaller, and the interface adhesion between the mica and the resin is not high enough so that the mechanical strength, especially toughness, of the product is reduced. For the same reason, the mica cannot be uniformly dispersed in the resin in the extrusion kneading step, and the surface of the molded articles is roughened. On the other hand, if the proportion of the mica is less than 10% by weight, its effect of preventing the deformation and shrinkage of molded products is very small.

Treatment of the mica with a silane coupling agent (organo-silicone compound) is further effective for the improvement of the mechanical properties of the composition. Examples of such silane coupling agents are γ-aminopropyltriethoxysilane, γ-glycidoxypropyltrimethoxysilane, vinyltriethoxysilane, vinyl-tris(β-methoxyethoxy)silane, and γ-methacryloxypropyltrimethoxysilane. These silane coupling agents may be coated on the surface of mica in advance, or may be added to, and kneaded with, the mixture of the mica, the polyarylene sulfide resin and the glass fibers in the step of extrusion kneading.

A composition composed of the glass fibers and the polyarylene sulfide resin with or without mica can be produced by known methods. For example, the chopped glass fibers are mechanically and uniformly mixed with the polyarylene sulfide resin in pellet or powder form with or without the mica powder by a mixer such as a drum tumbler and then the mixture is heated, melted and extruded by using a single-screw or twin-screw extruder. The extrudate is cooled and pelletized. Alternatively, the glass fibers and the polyarylene sulfide resin with or without the mica powder are uniformly mixed, and the resulting mixture is directly molded into articles by an injection molding machine. The molding temperature is 280° to 380° C.

The composition of this invention may further contain 0.1 to 60% by weight, based on the weight of the composition, of an inorganic filler such as barium sulfate, calcium sulfate, kaolin, calcined clay, pyrophyllite, bentonite, sericite, zeolite, nepheline syenite, talc, attapulgite, wollastonite, calcium silicate, calcium carbonate, magnesium carbonate, dolomite, antimony trioxide, zinc oxide, magnesium oxide, iron oxide, molybdenum disulfide, graphite and gypsum. It may also contain a mold releasing agent, a lubricant, a heat stabilizer, a blowing agent, etc.

The composition of this invention may further comprise 0 to 40 parts by weight, per 100 parts by weight of the polyarylene sulfide resin, of another resin such as polyamides, polycarbonate, polysulfone, polyarylsulfones, polyether sulfone, polyphenylene oxide, aromatic polyesters (e.g., polyethylene terephthalate, polybutylene terephthlate), polyimides, polyamideimides, epoxy resins, polyethylene, polypropylene, polyacetal, polymethylpentene, poly(p-xylene), poly(p-hydroxybenzoate), chlorinated polyethers, polyaryl ethers, and fluorocarbon resins.

In addition to the glass fibers, chopped strand glass fibers having a diameter of more than 11.5 microns and/or carbon fibers may be used in combination. The proportion of the additional glass fibers is 0 to 300 parts by weight per 100 parts by weight of the glass fibers.

The composition of this invention can be used in various applications, for example as automotive parts such as lamp reflectors or underhood parts near the engine, motor parts such as brush holders, and housings of connectors and pumps.

The following examples illustrate the present invention more specifically. All parts and percentages in these examples are by weight.

EXAMPLE 1

Sixty parts of powdery polyphenylene sulfide resin having a melt flow rate of 20 g/10 minutes and a cross-linking speed of 1.0 (RYTON P-4, a tradename for a product of Phillips Petroleum Co.) and 40 parts of chopped glass fibers treated with an aminosilane and a binder and having a diameter of 10 microns and a length of 3 mm were uniformly mixed in a drum tumbler. The mixture was heated, melted, kneaded and extruded by a twin-screw extruder having two screws rotating in the same direction, at a barrel temperature of 330° C. and a screw rotating speed of 200 rpm. The extrudate was cooled and pelletized.

The pellets were molded by a screw-type injection molding machine (IS-50, made by Toshiba Machinery Co., Ltd.) while maintaining the cylinder temperature, the injection pressure and the die temperature at 330° C., 800 kg/cm$^2$, and 120° C., respectively, to prepare test specimens for a tensile test in accordance with ASTM D-638 and a bending test in accordance with ASTM D-790.

As a result of the tensile test and the bending test, these specimens were found to have a tensile strength (TS for short) of 1800 kg/cm$^2$, a flexural strength (FS for short) of 2600 kg/cm$^2$, and a flexural modulus (FM for short) of 13×10$^4$ kg/cm$^2$. Thus, the molded articles showed very high strength and rigidity. Furthermore, the surfaces of the molded articles had gloss, and no raising of the glass fibers on the surfaces was observed.

In order to measure the diameter and length of the glass fibers present in the molded articles, the test specimens which had been used in the above tests were heated in a burning furnace at 600° C. for 3 hours to burn and remove the resin component. Then, the diameter and length of the glass fibers were measured by using a microscope. The diameter remained unchanged at 10 microns, but the length varied as shown below because the glass fibers were attenuated during the kneading and extruding operations.

| | |
|---|---|
| less than 0.1 mm | 5% |
| 0.1–0.2 mm | 7% |
| 0.2–0.3 mm | 14% |
| 0.3–0.4 mm | 55% |
| 0.4–0.5 mm | 12% |
| 0.5–0.6 mm | 5% |
| more than 0.6 mm | 2% |

Thus, the average length to diameter ratio (L/D) of the glass fibers in the molded articles was 36.

COMPARATIVE EXAMPLES 1 TO 3

Pellets were prepared and tested in the same way as in Example 1 except that commercially available chopped glass fibers treated with an aminosilane and a binder and having a diameter of 13 microns and a length of 3 mm (Chopped Strand MA-03-497, a product of Asahi Glass Fiber Co., Ltd.) were used instead of the chopped glass fibers in Example 1. The resulting molded article had a TS of 1250 kg/cm$^2$, an FS of 1800 kg/cm$^2$ and an FM of 13×10$^4$ kg/cm$^2$. Thus, the strength of the molded article was about 30% lower than that of the product obtained in Example 1. The glass fibers present in the molded article had a diameter of 13 microns, and a length varying as follows:

| | |
|---|---|
| less than 0.1 mm | 3% |
| 0.1–0.2 mm | 5% |
| 0.2–0.3 mm | 9% |
| 0.3–0.4 mm | 38% |
| 0.4–0.5 mm | 23% |
| 0.5–0.6 mm | 17% |
| more than 0.6 mm | 5% |

The averge L/D was 38 which is equivalent to that in Example 1.

In order to obtain the same strength as in Example 1, the above experiment was repeated except that the amount of the glass fibers used in Comparative Example 1 was increased to 55 parts and 70 parts, respectively. The strength of the resulting molded articles were lower than that of the product obtained in Example 1 as shown in Table 1, and the glass fibers rose to the surfaces making the product devoid of merchandize value.

EXAMPLES 2 TO 8

Pellets were prepared and tested in the same way as in Example 1 except that the diameter and amount of the glass fibers were changed or an inorganic filler was additionally incorporated as shown in Table 1. The results are shown in Table 1.

COMPARATIVE EXAMPLES 4 AND 5

In order to show that glass fibers having a diameter of 5 to 11.5 microns are effective for increasing the strength of polyarylene sulfide resins alone, Example 1 was repeated except that the resin was changed to polyacetal or polycarbonate as shown in Table 1. The results demonstrate that with these resins, no change in strength with the diameter of glass fibers was noted.

TABLE 1

| | Resin | | Glass fibers | | Filler | | TS (kg/cm²) | FS (kg/cm²) | FM × 10⁴ (kg/cm²) | Rising of glass fibers on the surface | L/D of the glass fibers in the molded article |
|---|---|---|---|---|---|---|---|---|---|---|---|
| | Type | Amount (parts) | Diameter (microns) | Amount (parts) | Type | Amount (parts) | | | | | |
| Example | | | | | | | | | | | |
| 1 | Polyphenylene sulfide | 60 | 10 | 40 | — | | 1800 | 2600 | 13 | No | 36 |
| 2 | Polyphenylene sulfide | 80 | 10 | 20 | — | | 1150 | 1820 | 10 | " | — |
| 3 | Polyphenylene sulfide | 40 | 10 | 60 | — | | 2100 | 2800 | 20 | Some | — |
| 4 | Polyphenylene sulfide | 60 | 6 | 40 | — | | 1830 | 2400 | 13 | No | — |
| 5 | Polyphenylene sulfide | 60 | 7 | 40 | — | | 1810 | 2450 | 13 | " | — |
| 6 | Polyphenylene sulfide | 60 | 11 | 40 | — | | 1700 | 2450 | 13 | " | — |
| 7 | Polyphenylene sulfide | 40 | 10 | 30 | CaCO₃ | 30 | 1300 | 1950 | 14 | " | — |
| 8 | Polyphenylene sulfide | 60 | 10---20<br>13---20 | 40 | — | | 1600 | 2300 | 13 | " | — |
| Comparative Example | | | | | | | | | | | |
| 1 | Polyphenylene sulfide | 60 | 13 | 40 | — | | 1250 | 1800 | 13 | No | 38 |
| 2 | Polyphenylene sulfide | 45 | 13 | 55 | — | | 1490 | 2000 | 18 | Yes | — |
| 3 | Polyphenylene sulfide | 30 | 13 | 70 | — | | 1530 | 2330 | 24 | " | — |
| 4 | Polyphenylene sulfide | 80 | 16 | 20 | — | | 810 | 1430 | 10 | No | — |
| 5 | Polyphenylene sulfide | 40 | 13 | 30 | CaCO₃ | 30 | 800 | 1200 | 12 | " | — |
| 6 | Polyacetal | 60 | 13 | 40 | — | | 1230 | 1370 | 7.5 | — | — |
| 7 | " | 60 | 10 | " | — | | 1210 | 1430 | 7.7 | — | — |
| 8 | Polycarbonate | 60 | 13 | " | — | | 1300 | 1600 | 8 | — | — |
| 9 | " | 60 | 10 | " | — | | 1320 | 1680 | 8 | — | — |
| 10 | Polybutylene terephthlate | 60 | 13 | " | — | | 1400 | 1800 | 11 | — | — |
| 11 | Polybutylene terephthlate | 60 | 10 | " | — | | 1420 | 1810 | 11 | — | — |

EXAMPLES 9 TO 12

Pellets were prepared and tested in the same way as in Example 1 except that mica powder (SUZORITE MICA, a product of Marietta Resourcers) was additionally incorporated in the amounts shown in Table 2. A disc, 1.6 mm in thickness and 100 mm in diameter, was prepared from the pellets, and its molding shrinkage and warpage were measured.

The molding shrinkage is the shrinkage (%) of the resin composition during molding of the disc in the flowing direction (∥) of the resin composition and in a direction (⊥) at right angles to it. The warpage is the ratio (%) of the rising length of the disc above the flat plane of the disc based on the diameter of the disc.

COMPARATIVE EXAMPLES 12 TO 14

Example 9 was substantially repeated using glass fibers having a diameter of more than 13 microns as shown in Table 2. The results are shown in Table 2.

TABLE 2

| | Resin (parts) | Mica Amount (parts) | Particle size (mesh) | Content of bonded water (%) | Mg/Fe weight ratio | Glass fibers Diameter (microns) | Amount (parts) | TS (kg/cm²) | FS (kg/cm²) | FM (kg/cm²) | ∥ (kg·cm/cm) | Molding shrinkage ∥/⊥ (%) | Warpage (%) |
|---|---|---|---|---|---|---|---|---|---|---|---|---|---|
| Example | | | | | | | | | | | | | |
| 9 | Polyphenylene sulfide (40) | (30) | Smaller than 325 | 1.0 | above 3 | 10 | 30 | 1400 | 2200 | 20 × 10⁴ | 7 | 0.3/0.3 | 0 |
| 10 | Polyphenylene sulfide (65) | (25) | Smaller than 200 | " | above 3 | 10 | 10 | 1070 | 1290 | 7 × 10⁴ | 6 | 0.3/0.35 | 0 |

TABLE 2-continued

| | Resin (parts) | Mica Amount (parts) | Particle size (mesh) | Content of bonded water (%) | Mg/Fe weight ratio | Glass fibers Diameter (microns) | Amount (parts) | TS (kg/cm²) | FS (kg/cm²) | FM (kg/cm²) | II (kg.cm/cm) | Molding shrinkage II/⊥ (%) | Warpage (%) |
|---|---|---|---|---|---|---|---|---|---|---|---|---|---|
| 11 | Polyphenylene sulfide (70) | (10) | Smaller than 200 | " | above 3 | 10 | 20 | 1130 | 1420 | 10 × 10⁴ | 7 | 0.3/0.4 | 0.5 |
| 12 | Polyphenylene sulfide (40) | (30) | Smaller than 200 | " | above 3 | 8 | 30 | 1630 | 1940 | 17 × 10⁴ | 8 | 0.2/0.25 | 0.3 |
| Comparative Example | | | | | | | | | | | | | |
| 12 | Polyphenylene sulfide (40) | — | — | — | — | 13 | 60 | 1450 | 2100 | 20 × 10⁴ | 5 | 0.2/1.0 | 3.5 |
| 13 | Polyphenylene sulfide (40) | (30) | Smaller than 325 | 1.0 | above 3 | 13 | 30 | 980 | 1430 | 19.5 × 10⁴ | 4 | 0.3/0.3 | 0.3 |
| 14 | Polyphenylene sulfide (40) | (30) | Smaller than 200 | " | above 3 | 16 | 30 | 900 | 1290 | 20 × 10⁴ | 3 | 0.3/0.3 | 0.2 |

What we claim is:

1. A glass fiber-reinforced polyarylene sulfide resin composition comprising 30 to 95 parts by weight of a polyarylene sulfide resin and 70 to 5 parts by weight of glass fibers having a diameter of from 5 to 11.5 microns, the total of the resin and glass fibers being 100 parts by weight, and as an optional component, mica powder.

2. The composition of claim 1 wherein the polyarylene sulfide resin has a melt flow rate, at a temperature of 300° C. under a load of 2160 g, of from 8 to 50.

3. The composition of claim 1 wherein the glass fibers have a length of from 0.5 to 15 mm.

4. The composition of claim 1 wherein the mica powder is present and contains at least 90% by weight of particles having a particle size smaller than 100 mesh, and has an Mg/Fe weight ratio of at least 2, a bonded water content of not more than 2% by weight and a dehydration starting temperature of at least 400° C.

5. The composition of claim 1 wherein the amount of the mica powder is 10 to 70% by weight based on the weight of the polyarylene sulfide resin.

6. An article molded from the composition of claim 1.

7. The composition of claim 4 wherein the amount of the mica powder is 10 to 70% by weight based on the weight of the polyarylene sulfide resin.

8. The composition of claim 1 which comprises 35 to 90 parts by weight of the polyarylene sulfide resin and 65 to 10 parts by weight of the glass fibers, the total amount of the resin and glass fibers being 100 parts by weight.

9. The composition of claim 1 wherein the glass fibers have a diameter of from 7 to 11 microns.

* * * * *